United States Patent [19]
Abe et al.

[11] Patent Number: 5,544,050
[45] Date of Patent: Aug. 6, 1996

[54] SIGN LANGUAGE LEARNING SYSTEM AND METHOD

[75] Inventors: Masahiro Abe; Hiroshi Sakou, both of Dublin, Ireland; Hirohiko Sagawa, Kokubunji, Japan; Akira Ichikawa, Musashino, Japan; Kiyoshi Inoue, Tokyo, Japan; Kiyoshi Arai, Hachioji, Japan; Takanori Shimura, Chiba, Japan; Yuji Toda, Hachioji, Japan

[73] Assignee: Hitachi, Ltd., Tokyo, Japan

[21] Appl. No.: 114,083

[22] Filed: Aug. 31, 1993

[30] Foreign Application Priority Data

Sep. 3, 1992 [JP] Japan ................................. 4-235627

[51] Int. Cl.$^6$ .......................... G06F 3/14; G06F 17/21; G06F 17/28
[52] U.S. Cl. .......................... 364/419.13; 364/419.01; 364/419.02; 364/419.03; 364/419.07; 395/2.8; 395/2.86
[58] Field of Search .................... 364/419.13, 419.02, 364/419.03, 419.05, 419.07; 382/1; 379/52, 93; 381/36; 395/2.8, 2.86

[56] References Cited

U.S. PATENT DOCUMENTS

| | | | |
|---|---|---|---|
| 4,307,266 | 12/1981 | Messina | 179/2 DP |
| 4,368,459 | 1/1983 | Sapora | 340/407 |
| 4,414,537 | 11/1983 | Grimes | 340/365 R |
| 4,546,383 | 10/1985 | Abramatic et al. | 358/85 |
| 4,878,843 | 11/1989 | Kuch | 434/12 |
| 5,047,952 | 9/1991 | Kramer et al. | |

FOREIGN PATENT DOCUMENTS

| | | |
|---|---|---|
| 2144675 | 4/1990 | Japan. |
| WO89/12290 | 12/1989 | WIPO. |

OTHER PUBLICATIONS

"Gesture description and structure of a dictionary ..." Xu et al., Transactions of the Institute of Tech., Sep. 1993.
Kurokawa, "Gesture coding and a gesture dictionary for a nonverbal interface" IEICE Trans. on Fund. of Elec., Feb. 1992.
"Gesture Recognition using Recurrent Neural Network" Murakami, ©1991 #237-242.
"Workplace Concepts in Sign and Text a Computerized Sign Language Dictionary" Western Penn. School of Deaf 1991.
H. Kawai et al, "Deaf-and-Mute Sign Language Generation System", Pattern Recognition, vol. 18, No. 3/4, 1985, pp. 199-205.
T. Kurokawa, "Gesture Coding and a Gesture Dictionary for a Nonverbal Interface", IEICE Transactions on Fundamentals of Electronics, Communications and Computer Sciences, vol. E75-A, No. 2, 1992, pp. 112-121.
K. Wilt et al, "Computer-Aided Cued Speech Training/ Translation", Proceedings of the Johns Hopkins National Search for Computing Applications to assist persons with Disabilities, 1992, pp. 29-30.

(List continued on next page.)

Primary Examiner—Robert A. Weinhardt
Assistant Examiner—Stephen R. Tkacs
Attorney, Agent, or Firm—Fay, Sharpe, Beall, Fagan, Minnich & McKee

[57] ABSTRACT

In a sign-language learning system, the data of sign-language desired by a learner can be outputted quickly and accurately and, moreover, in the display method matching the requirements of individual learners, and the individual learners can easily make additional registration. The sign-language data are stored in a sign-language dictionary, and desired sign-language data are searched on the basis of an entry word or contents by a dictionary search device. The searched sign-language data are displayed in a display output device in accordance with a requirement of a learner by image synthesis. The sign-language data are registered by a dictionary registration device.

13 Claims, 8 Drawing Sheets

OTHER PUBLICATIONS

T. Takahashi et al, "A Hand Gesture Recognition Method and Its Application", Systems and Computers in Japan, vol. 23, No. 3, 1992, pp. 38–48.

Technical Report of IPSJ (Information Processing Society of Japan), vol. 90, No. 66, 90–CG–46, 46–6, Aug., 1990, pp. 37–42.

Technical Report of IPSJ (Information Processing Society of Japan), vol. 90, No. 65, 90–CG–45, 45–5, Jul., 1990, pp. 1–8.

IEICE (The Institute of Electronics, Information and Communication Engineerings), Fall Conference D–408, 1990, pp. 6–410.

FIG. 2

| WORD | CLASSIFI-CATION OF FIELD | CLASSIFI-CATION OF LANGUAGE | MORPHEME STRING | TEXT | |
|---|---|---|---|---|---|
| CHILD CARE | 1 | 2 | CHILD, CARE | GESTURE OF CHILD CARE | ~1101 |
| INSUBORDI-NATION | 3 | 2 | INSUBORDI-NATION | GESTURE OF REBUFF | ~1102 |
| NURSE | 1 | 2 | CARE, FEMALE | FEMALE WHO TAKES CARE, MORE ACCURATE IF GESTURE OF CHILD IS PUT FIRST | |
| ... | ... | ... | ... | ... | |

Columns: 111, 112, 113, 114, 115

FIG. 3

| MORPHEME | CLASSIFI-CATION OF KIND | CLASSIFI-CATION OF FACIAL EXPRESSION | TIME SEQUENTIAL DATA | |
|---|---|---|---|---|
| CHILD | a | b | 9241·········· | ~1201 |
| FEMALE | ... | ... | ... | |
| CARE | ... | ... | ... | |
| ... | | | | |

Columns: 121, 122, 123, 124

| DATA | | TIME | T0 | T0 | ... | Tn | |
|---|---|---|---|---|---|---|---|
| RIGHT HAND | FIRST FINGER | 1ST JOINT | | | | | ~611 |
| | | 2ND JOINT | | | | | ~612 |
| | SECOD FINGER | 1ST JOINT | | | | | |
| | | 2ND JOINT | | | | | |
| | ... | ... | | | | | |
| | FIFTH FINGER | 1ST JOINT | | | | | |
| | | 2ND JOINT | | | | | |
| | POSI-TION | x | | | | | ~613 |
| | | y | | | | | ~614 |
| | | z | | | | | ~615 |
| | DIREC-TION | $\alpha$ | | | | | ~616 |
| | | $\beta$ | | | | | ~617 |
| | | $\gamma$ | | | | | ~618 |
| LEFT HAND | FIRST FINGER | 1ST JOINT | | | | | |
| | | 2ND JOINT | | | | | |
| | SECOD FINGER | 1ST JOINT | | | | | |
| | | 2ND JOINT | | | | | |
| | ... | ... | | | | | |
| | FIFTH FINGER | 1ST JOINT | | | | | |
| | | 2ND JOINT | | | | | |
| | POSI-TION | x | | | | | |
| | | y | | | | | |
| | | z | | | | | |
| | DIREC-TION | $\alpha$ | | | | | |
| | | $\beta$ | | | | | |
| | | $\gamma$ | | | | | |

610 — RIGHT HAND
620 — LEFT HAND
601, 602, 603 — column headers

SIGN LANGUAGE LEARNING SYSTEM AND METHOD

BACKGROUND OF THE INVENTION

The present invention relates to a sign-language learning system and method which store, search and output information used in learning of a sign-language, and which efficiently enable learning of the sign-language.

A sign-language is a gesture language with an independent system which has been developed as a communication means of deaf people. The inventors have proposed a sign-language translation system which uses a glove with a special sensor to convert motion of parts of the hands into electrical signals, and which translates the electrical signals into a spoken language (U.S. patent application Ser. No. 08/029,046, filed Mar. 9, 1993, and entitled "SIGN-LANGUAGE TRANSLATION SYSTEM AND METHOD").

Further, the inventors have proposed a continuous sign-language recognition system in which, in order to perform normalization of a pattern of a sign-language in consideration of nonlinear expansion and compression of the pattern of the sign-language, correspondence between samples for a standard pattern is obtained by means of the DP collation, and an average between correspondence points is calculated to prepare a standard pattern for the sign-language (U.S. patent application Ser. No. 08/111,380, filed Aug. 24, 1993, claiming the priority based on Japanese patent applications Nos. 04-247285 and 04-235633, and entitled "SIGN RECOGNITION APPARATUS AND METHOD AND SIGN TRANSLATION SYSTEM USING SAME".

As described above, there are some examples for recognizing a sign-language used by deaf people mainly and outputting it as a spoken language, while there is no system used by hearing people and deaf people in order for them to learn a sign-language itself. Heretofore, in learning a sign-language, a textbook explaining a definite method of a sign-language by photographs and illustrations, and video tapes recording images, have been used.

However, the motion of a sign-language can be expressed roughly in books such as the textbooks, while there has remained the problem that a positional relationship in space and a subtle change of a speed have been difficult to express.

An image recording medium such as the video tape can accurately express a series of motions but cannot make a display in the form satisfying the requirement of a learner in such a way as to quickly search desired data, to change a viewpoint in various directions, to replace an operation by a reverse operation for the left-handed, and so forth.

When a learner attempts to examine which meaning a certain motion of a sign-language has or to examine if any other sign-languages having similar motion exist, this search operation has been extremely difficult because the contents of motions must be compared one by one.

In addition to great location difference and individual difference, new words are always being generated and, moreover, the words always change. According to the prior art, however, it has been extremely difficult for the learner to expand the text by adding new words by himself.

It has not been possible, either, to test to which extent the learner has learned the sign-language.

SUMMARY OF THE INVENTION

It is an object of the present invention to provide an efficient sign-language learning system and method capable of offering data of a sign-language required by a learner (mainly hearing people) quickly and, accurately and moreover, in the form satisfying the requirement of an individual learner.

It is another object of the present invention to provide a sign-language learning system and method having high extensibility which enables an individual learner to easily add and register data by himself.

In order to achieve the objects, the present invention provides a sign-language learning system capable of registration and search, and employs the following construction.

The sign-language learning system of the present invention comprises input means for inputting spoken language data or sign-language data at the time of search and inputting sign-language data at the time of registration, means for storing the sign-language data, means for searching the stored sign-language data from the spoken language data or the sign-language data inputted at the time of search, means for registering the sign-language data inputted at the time of registration, and means for outputting the searched or registered sign-language data in accordance with the requirement of a learner.

The means for storing the sign-language data may comprise a morpheme dictionary for storing sign-language data for each morpheme constituting a minimum constituent unit of the sign-language and a word dictionary for storing word data of a spoken language and information indicative of a combined expression of words of the spoken language and morphemes of the sign-language.

The means for outputting the sign-language data in accordance with the requirement of the learner can produce a laterally inverted object when the motion of the sign-language is displayed.

Furthermore, the speed of outputting the motion of the sign-language can also be changed.

When a kind of sign-language is designated at the time of search, the searched result can be converted into the sign-language of the designated kind and then outputted.

A function of examining whether the learner has understood or not can be also provided.

The sign-language learning system of the present invention can store the sign-language data, search the sign-language data desired to be referred to by comparison with entry words or contents of the spoken language, change a viewpoint according to a learner's requirement, change personnel, change the direction for right-handed people to the direction for left-handed people and vice versa, add facial expression, and change a display speed. Accordingly, the learner can know quickly and correctly the desired data. The sign-language data can be divided into morphemes and words to be stored in the morpheme dictionary for the sign-language and the word dictionary for the spoken language, so that a registration procedure can be carried out easily and a storage space can be utilized efficiently. Since the sign-language data are divided into a common dictionary and an individual dictionary and are thus preserved, the system can be easily adapted to the characteristics of each user. Furthermore, when the learning system includes input/output means by speech, learning efficiency and effects can be improved.

DESCRIPTION OF THE PREFERRED EMBODIMENTS

An embodiment of the present invention is now described with reference to FIGS. 1 to 9.

Figure 1:
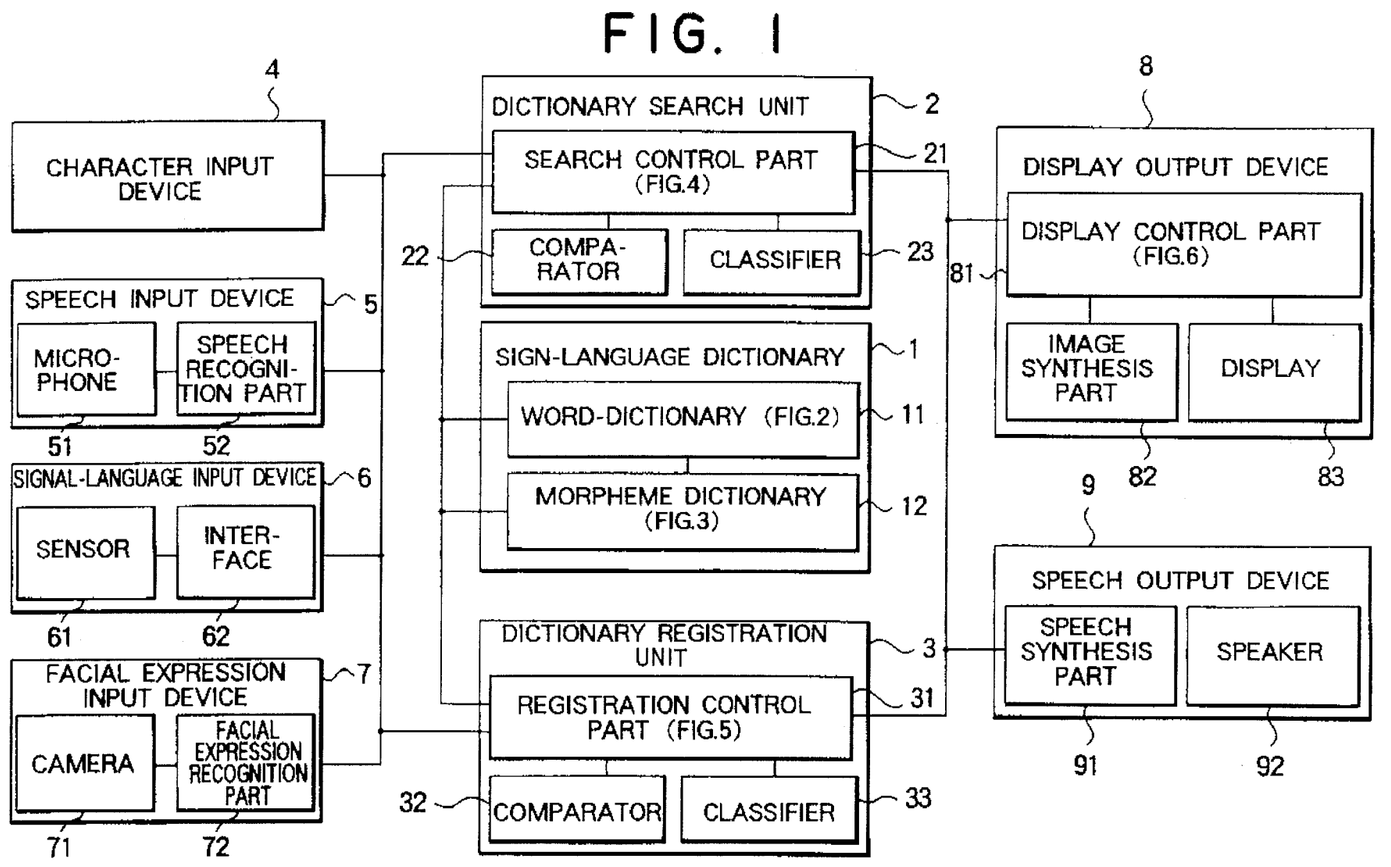
FIG. 1 is a system configuration of an embodiment of the present invention.

FIG. 1 is a system structural diagram showing an embodiment of the present invention including a sign-language dictionary 1 for storing sign-language data, a dictionary search unit 2 for searching sign-language data from the sign-language dictionary 1, a dictionary registration unit 3 for registering the sign-language data in the sign-language dictionary 1, a character input device 4 such as a keyboard, a speech input device 5 for inputting data by speech recognition, a sign-language input device 6 for inputting the sign-language data (as time sequential data), a facial expression input device 7 for recognizing the facial expression and inputting it, a display output device 8 for displaying the input and results of the search and registration, and a speech output device 9 for outputting the input and results of the search and registration by speech synthesis.

Figure 2:
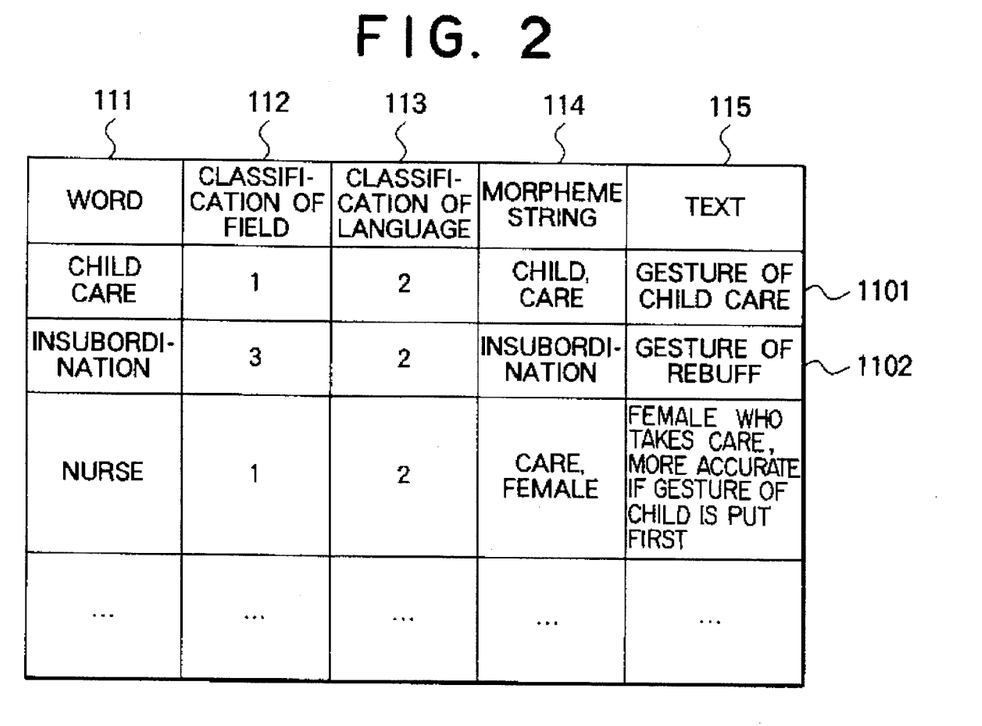
FIG. 2 shows the structure of a word dictionary.

FIG. 2 is a table showing the structure of a word dictionary 11 for the spoken language as one of the constituent elements of the sign-language dictionary 1 and its definite example, and includes an entry of the word 111 of the spoken language, a classification of field 112 in which the word is used, a classification of language 113 expressing to which kind of sign-language of which country the sign-language data corresponding to the word of the spoken language belongs, a morpheme string 114 indicative of a combined expression of the word of the spoken language and the morphemes of the sign-language, and a text 115 for storing auxiliary data such as etymology of the sign-language, remarks and so forth.

Figure 3:
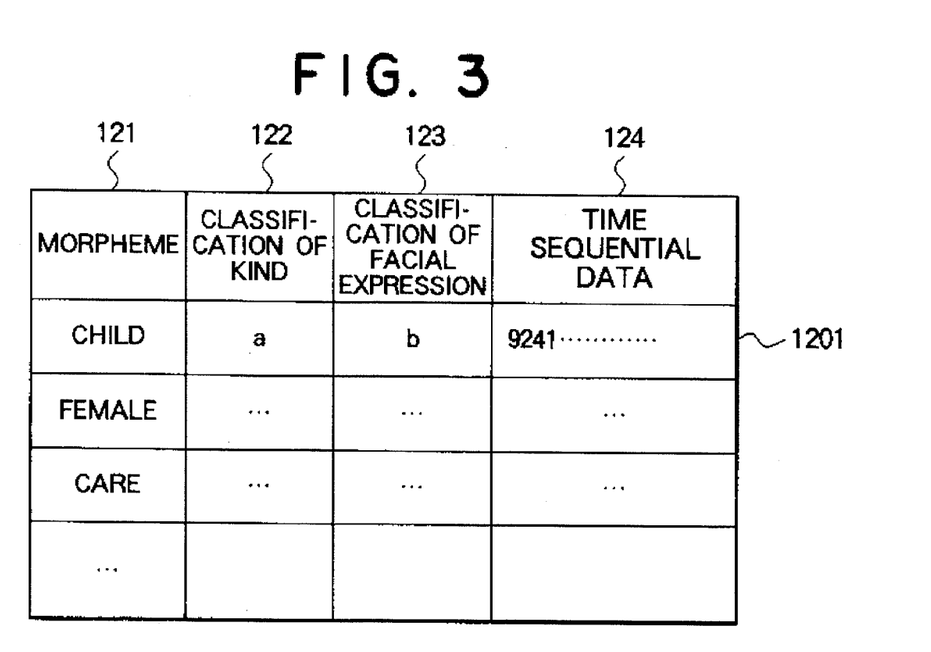
FIG. 3 shows the structure of a morpheme dictionary.

FIG. 3 is a table representing the structure of the morpheme dictionary 12 of the sign-language as one of the constituent elements of the sign-language dictionary 1 and its definite example, and includes denotes an entry of the morpheme 121 constituting a minimum constituent unit of the sign-language, a classification of kind 122 expressing the features of time sequential data of the motion of the hands of the sign-language constituting the sign-language data, a classification of facial expression 123 for classifying the feature of the facial expressions when the operation of the sign-language is made, and time sequential data 124 of the motion of the hands of the sign-language constituting the sign-language data. In this embodiment, two dictionaries are provided, while three dictionaries including the word dictionary of the spoken language, the word dictionary of the sign-language (morpheme dictionary) and a dictionary indicative of the correspondence between both the dictionaries for the spoken language and the sign-language may be provided.

Figure 9:
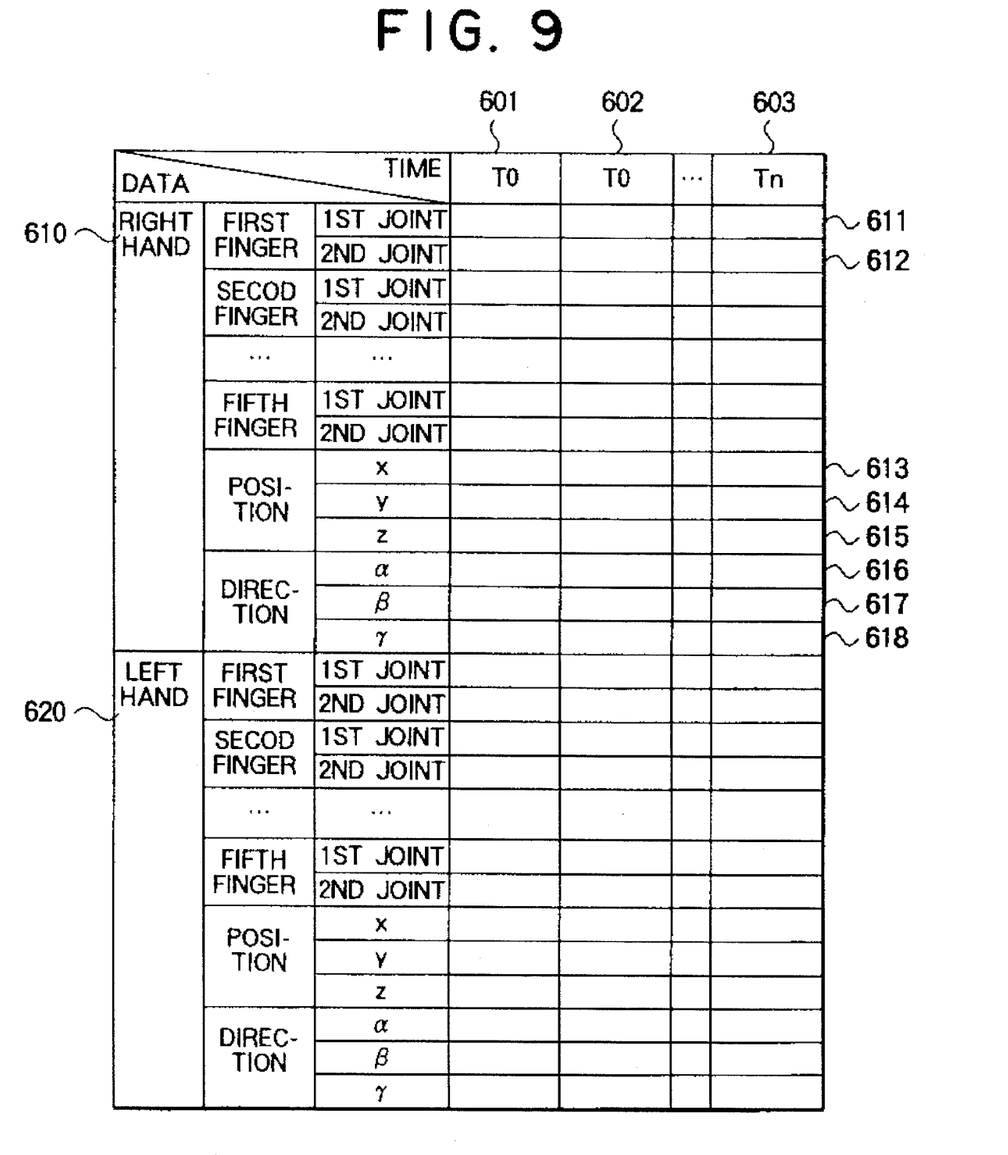
FIG. 9 shows the structure of a sign-language input data.

FIG. 9 is a table showing in detail the data structure of the sign-language data (time sequential data) inputted from the sign-language input device 6. It is a table for storing the history of the data 610 relating to the condition of the right hand and of the data 620 relating to the condition of the left hand at every predetermined time interval. The sign-language data input device 6 includes a sensor 61 for measuring the bending state of each finger of the hands, and the positions and directions of the hands, and an interface 62 for converting them to electrical signals, and such an input device 6 is well known. Reference numerals 601, 602 and 603 denote the storage positions of the right hand data 610 and the left hand data 620 at the sampling times T0, T1 and Tn, respectively. Reference numeral 611 denotes data expressing the angle of the first joint of the first finger of the right hand, 612 data expressing the angle of the second joint of the first finger of the right hand, 613 data expressing the position of the x coordinates of the right hand, 614 data expressing the position of the y coordinates of the right hand, 615 data expressing the position of the z coordinates of the right hand, 616 data expressing the angle of the direction of the right hand to the x axis, 617 data expressing the angle of the direction of the right hand to the y axis, and 618 data expressing the angle of the direction of the right hand to the z axis.

The operation of the embodiment is now described with reference to FIGS. 4, 5, 6, 7 and 8.

Figure 7:
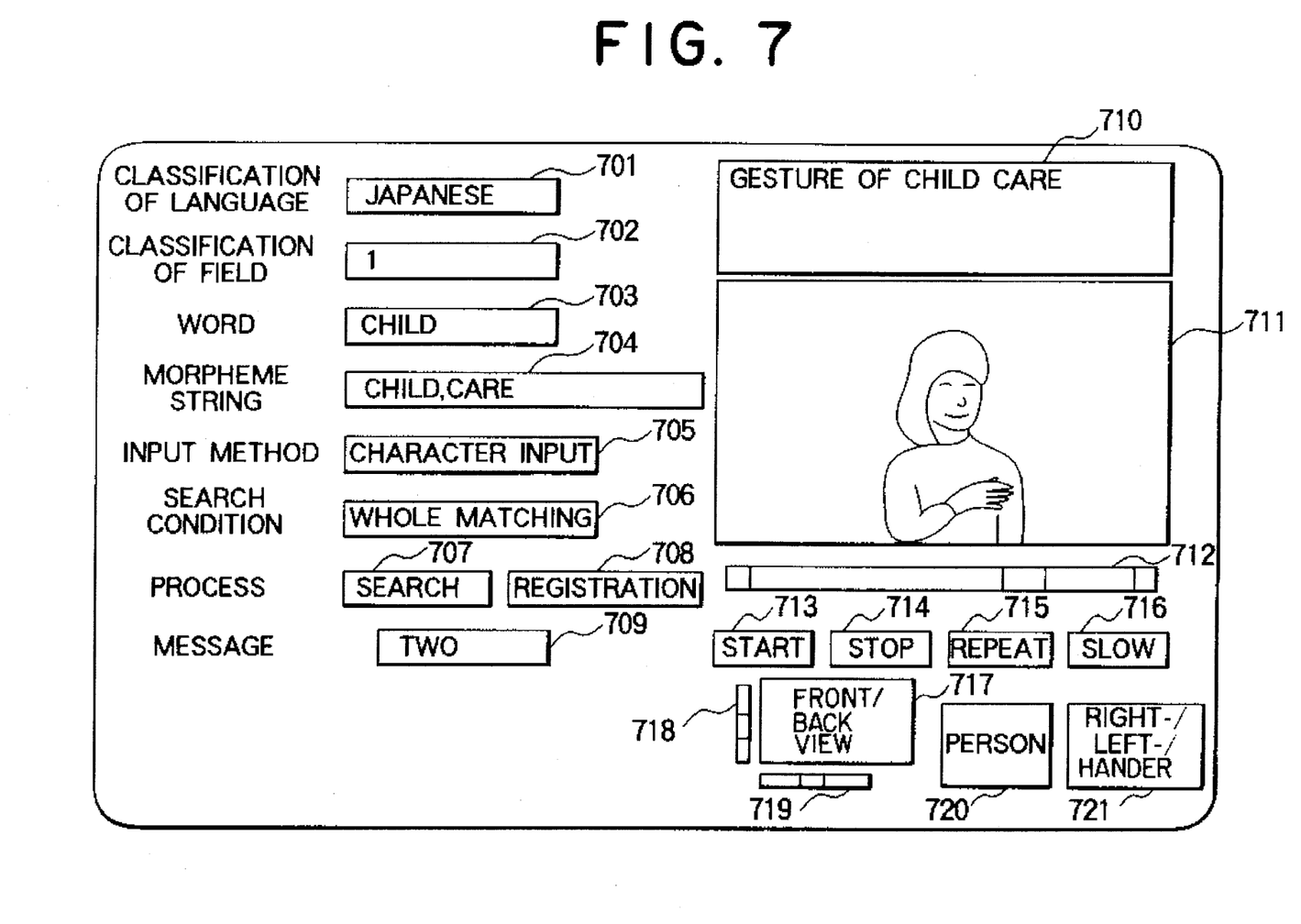
FIG. 7 shows a definite example of a search display output.

To begin with, the operation of searching the sign-language data from the sign-language dictionary 1 and outputting the data will be explained. FIG. 7 shows a definite example of the screen shown on the display 83 of the display output device 8 during the search, having input/output areas 701–721 for displaying the data of the instructions or result of the search, including an input/output area 701 of the classification of languages 113; an input/output area 702 of classification of fields 112; an input/output area 703 of words 111 of the spoken language; an input/output area 704 of morpheme string 114 of the sign-language; an input/output area 705 for designating which of the character input device 4, the speech input device 5 and the sign-language input device 6 should be used as the input device for search; an input/output area 706 for designating whether a word should be searched for a complete match or a word containing a designated morpheme at a part thereof should be searched, as the condition of the search; an input/output area 707 for displaying the designation of the search process; an input/output area 708 for displaying the designation of the registration process; an output area 709 for displaying the report of the search result; an output area 710 for displaying a text 115; and an output area 711 for displaying image data of the sign-language generated from the time sequential data 124 and from the classification of facial expression 123. Reference numerals 712 to 721 denote input/output areas for controlling the display method of the inputted image data, which include an input/output area 712 for displaying the controlling of the position, with time, of a presently displayed point with respect to the length of the data to be displayed; an input/output area 713 for designating the start of display; is an input/output area 714 for designating the stop of display; an input/output area 715 for designating repetition of display; an input/output area 716 for designating retardation of a display speed; an input/output area 717 for designating and switching whether a front view or a back view should be displayed of a person performing the sign-language motion when the sign-language operation is displayed; an input/output area 718 for designating the change of height of the viewpoint in a vertical direction when the sign-language motion is displayed; an input/output area 719 for designating similarly the change in a lateral direction; an input/output area 720 for designating and switching the person performing the sign-language motion to one's favorite person; and an input/output area 721 for designating and switching right-handedness or left-handedness of the person performing the sign-language motion.

Figure 4:
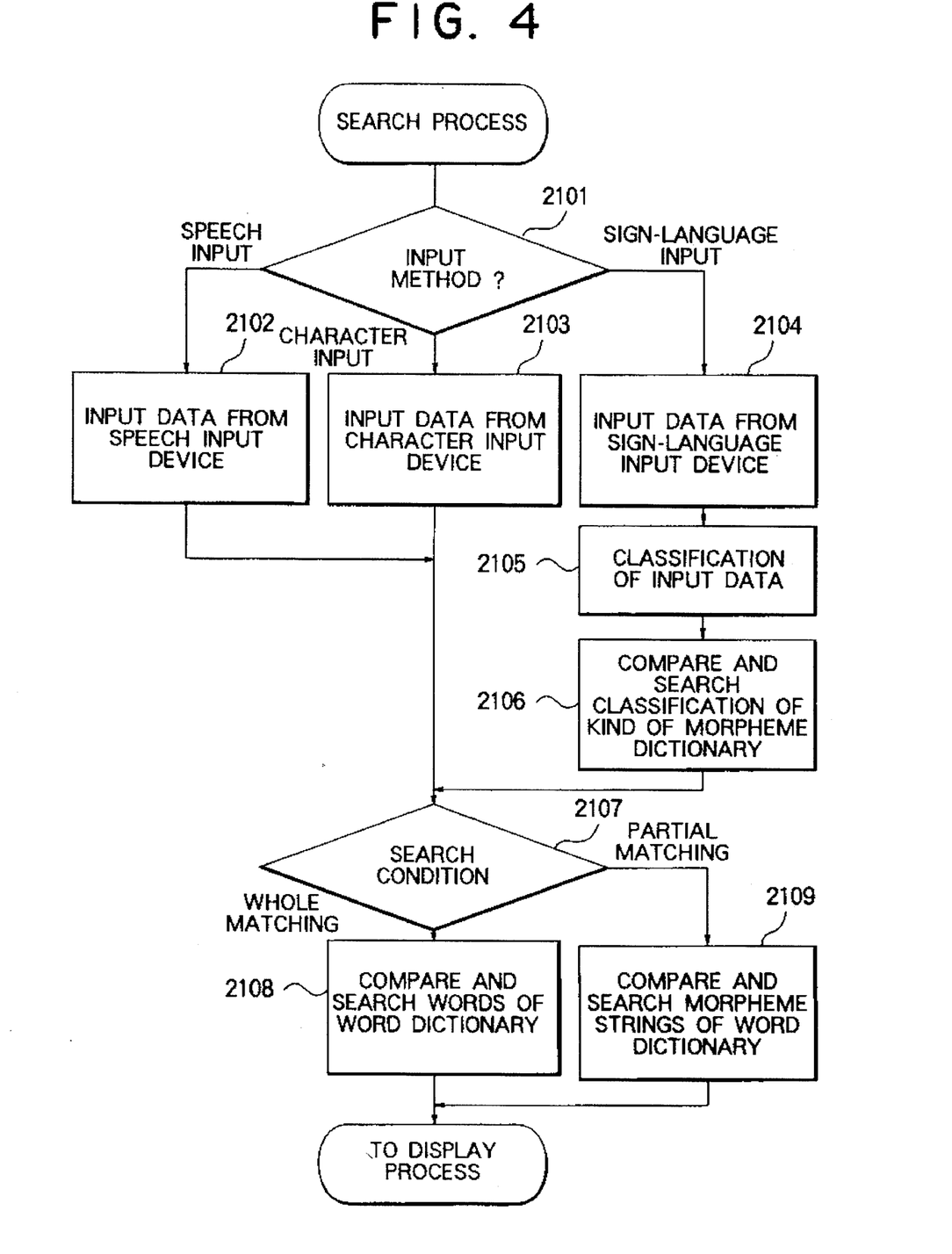
FIG. 4 shows a search process.

FIG. 4 is a flow chart showing the operation of the search control part 21 of the embodiment. The operation is started when the search is designated in the input/output area 707.

An input method of the input/output area 705 is judged in step 2101. If it is a speech input, the flow proceeds to step 2102 and if it is a character input, the flow proceeds to step 2103. If it is a sign-language input, the flow proceeds to step 2104.

The data necessary for the search (entry words or contents of the spoken language relative to the sign-language) are inputted from the speech input device 5 through speech recognition in step 2102, and are set to the input/output areas 703 and 704. A default value is set to the input/output areas 701 and 702, but it is reset when a user instructs re-writing.

In step 2103, the data necessary for the search (entry words or contents of the spoken language relative to the sign-language) are similarly inputted from the character input device 4, and are set to the input/output areas 703 and 704.

In step 2104, the time sequential data constituting the sign-language data are inputted from the sign-language input device 6 if necessary. This operation is generally used when the learner performs the sign-language actually to learn it after a sample relative to the sign-language has been displayed in the display output device 8 or the like.

In step 2105, the time sequential data are classified into patterns using a classifier 23 of the dictionary search unit 2 to obtain the classification of kind. It is also possible to employ various other methods and means such as a method using statistical means and a method using a neural network. Accordingly, the present invention is not limited by a specific pattern classification method.

In step 2106, the classification of kinds 122 of the morpheme dictionary 12 of the sign-language dictionary 1 is compared by the comparator 22 of the dictionary search unit 2 using the classification of kind obtained in step 2105 as a key so as to search the morpheme 121 falling within the same classification of kind. The morpheme thus searched is set to the input/output areas 703 and 704. In step 2107, the search condition of the input/output area 706 is judged, and the flow proceeds to step 2108 in the case of complete matching and to step 2109 in the case of partial matching.

In step 2108, the words 111 of the word dictionary 11 of the sign-language dictionary 1 are compared by the comparator 22 of the dictionary search unit 2 using the word of the input/output area 703 as the key so as to find the word having the same entry. The message of the result of this search is set to the output area 709.

In step 2109, the morpheme strings 114 of the word dictionary 11 of the sign-language dictionary 1 are compared by the comparator 22 of the dictionary search unit 2 using each morpheme of the input/output area 704 as the key so as to find the word containing the morpheme of the input/output area 704 at its part. The message of the result of this search is set to the output area 709.

In the dictionary search unit 2 of this embodiment, the speech data from the speech input device 5, the text data from the character input device 4 or the sign-language data from the sign-language input device 6 are inputted in units of "word", and are compared with the contents of the word dictionary 11 of the sign-language dictionary 1 to take out the corresponding sign-language data (morpheme data) from the morpheme dictionary 12 for output, so that learning of the sign-language is enabled. However, the learning of the sign-language is not limited to units of "word", but can be accomplished in units of "sentence".

In the present embodiment (specifically Japanese sign-language), there are three kinds of sign-language including (1) the "traditional sign-language" which has been traditionally used by deaf people, (2) the "simultaneous sign-language" in which the meaning of the word of the sign-language is coincident with the Japanese language, and (3) the "intermediate type sign-language" in which the words are arranged in the same order as that of the spoken language and attached words such as post-positional words are omitted. (The mainstream of the sign-language in English is the "traditional sign-language", and the ASL (American Sign Language) is mainly used.)

It is considered that learning of the sign-language in "sentence" units is made using the "intermediate type sign-language" by way of example. First of all, (1) the morpheme analysis process in which analysis and conversion of each language are performed from speech, characters or the like and the attached words such as postpositional words are deleted, is made and then (2) the grammatical construction and meaning analysis process (in which the dependence of words in the sentence is analyzed to recognize the role (case) of the words and the acting direction of the verb, and which can be treated with change of the order of words) and (3) the intention understanding process (understanding the intention of the utterance) are introduced so that learning from the "sentence" of the spoken language to the "sentence" of the sign-language can be made.

Figure 6:
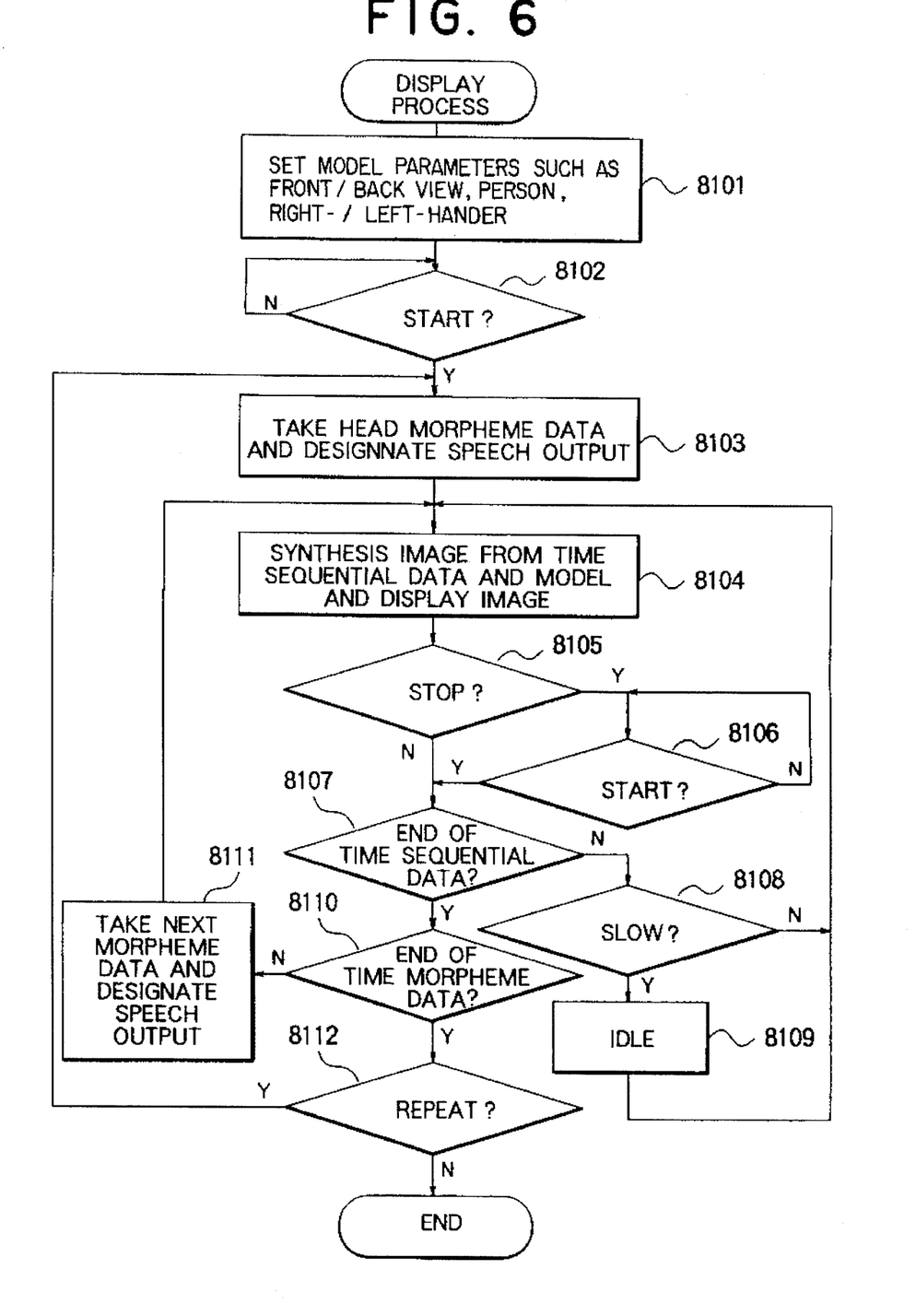
FIG. 6 shows a display process.

Consecutively, the display control part 81 of the display output device 8 is activated, and the display process shown in FIG. 6 is started. Hereinafter, this display process will be explained with reference to FIG. 6.

In step 8101, parameters for image synthesis such as selection of front/back view, designation of a person and selection of right-/left-hander are prepared in accordance with the contents of the input/output areas 717 to 721 which control the display method of the image data.

In step 8102, the input/output area 713 is monitored, and the designation of the start is awaited. When the start is designated, the flow proceeds to step 8103.

In step 8103, the word entry searched of the input/output area 703 and the data of the text of the output area 710 are sent to the speech output device 9 and the speech is outputted. In the case of FIG. 7, for example, the audible "child care" and the speech "gesture of child care" are outputted (in this case, the text data 1101 of the word dictionary 11 is used). Next, the data of the first morpheme in the input/output area 704 are taken out from the morpheme dictionary 12. In the case of FIG. 7, for example, the data relative to the morpheme of "child" are taken out. Then, the entry 121 of the data relative to the morpheme is sent to the speech output device 9. In the case of FIG. 7, the "child" is outputted.

In step "8104", the image of the sign-language of one frame is generated by the image synthesis part 82 in accordance with the parameters prepared in step 8101 from the classification of facial expression 123 of the data relative to the morpheme and the time sequential data 124 constituting the sign-language data, and the image is displayed and outputted to the output area 711.

A method which has already been known well in the field of computer graphics is used for the processing in the image synthesis part 82 of the display output device 8. For example, Technical Report of IPSJ (Information Processing Society in Japan), Vol. 90, No. 66 (90-CG-46), 46-6 (Aug. 17 to 18, 1990), pp. 37–42, describes the generation of the shapes of the hands of the sign-language. According to this report, models of the hands are defined by a frame which combines neighboring joints and by a polyhedron which accompanies a frame, and the shape of the hand corresponding to the change of the angle of joints can be generated by causing the polyhedron, which accompanies each frame, to follow. up the motion of the frame. As discussed in this literature, a more realistic shape can be generated by executing the process which controls the connection planes of the polyhedron and the interval of the connection planes in accordance with the moving process of the hand.

The generation of the facial expression is described, for example, in Technical Report of IPSJ (Information Processing Society in Japan), Vol. 90, No. 65 (90-CG-45), 45-5 (Jul. 20, 1970), pp. 1–8. A complicated expression can be generated by moving points on the surface of the face by displacement quantities specific to the expression.

The image of the sign-language can be generated by combining the body components generated in the way described above.

In step 8105, the input/output area 714 is examined. If the stop is designated, the flow proceeds to step 8106 and stops there temporarily, and if the stop is not designated, the flow proceeds immediately to step 8107.

In step 8106, the input/output area 713 is monitored, and the designation of re-start is awaited.

In step 8107, whether or not all the time sequential data 124 of the morpheme data have been outputted is judged. If any data remain, the flow proceeds to step 8108, and if no data remain, the flow proceeds to step 8110.

In step 8108, the input/output area 716 is examined to judge whether or not the slow display is designated. If the slow display is designated, the flow spends a predetermined time in step 8109 and then proceeds to the display operation of the frame of the next screen. If the display is not the slow display but is the display of the ordinary speed, the flow proceeds immediately to the display operation of the next frame.

In step 8110, whether or not all the morphemes in the input/output area 704 have been outputted is judged. If this output operation is not completed, the flow proceeds to step 8111 and if it is completed, the flow proceeds to step 8112.

In step 8111, the data relative to the next morpheme in the input/output area 704 are taken out from the morpheme dictionary 12. Next, the entry 121 of the data of the morpheme is sent to the speech output device 9 and the speech output is made. Next, the flow returns to step 8104, and the output of the data of the morpheme is started.

In step 8112, the input/output area 715 is examined to judge whether or not the repeated display is designated. If the repeated display is designated, the flow returns to step 8103. If it is not, the display process is completed.

Next, the operation for registering the sign-language data into the sign-language dictionary 1 in the embodiment will be explained.

Figure 8:
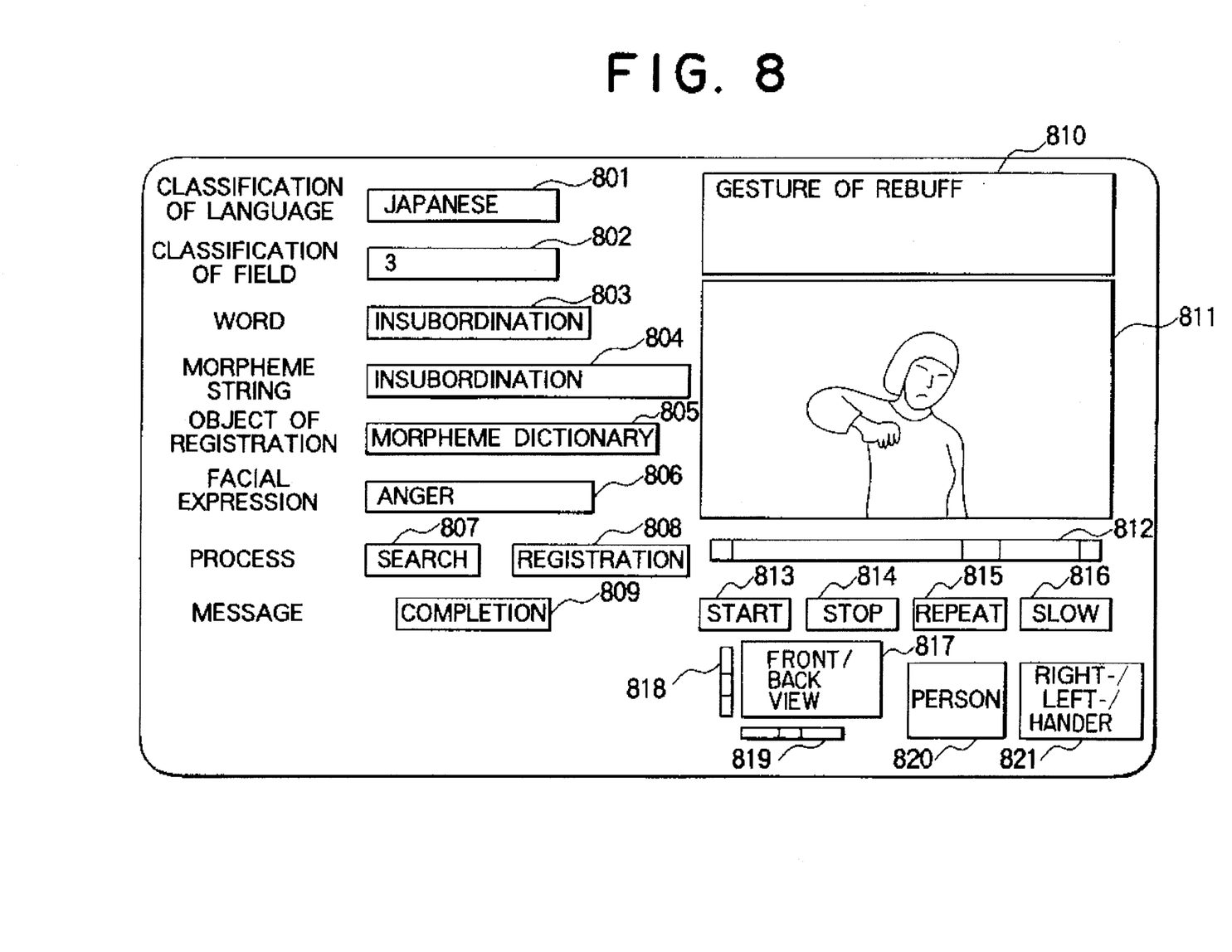
FIG. 8 shows a definite example of a registration display output.

FIG. 8 shows a definite example of the screen shown on the display 83 of the display output device 8 at the time of registration, which have input/output areas 801–821 for displaying data of designation or result of the registration, including an input/output area 801 of the classification of languages 113; an input/output area 802 of the classification of fields 112; an input/output area 803 of the words 111; an input/output area 804 of the morpheme strings 114; an input/output area 805 for designating the dictionary as the object of registration; an input/output area 806 of the classification of facial expressions 123 to be registered; an input/output area 807 for expressing the designation of the search process; an input/output area 808 for expressing the designation of the register process; an output area 809 for expressing the report of the registration result; an input/output area 810 for expressing the text 115; an output area 811 for displaying the image data of the sign-language generated from the time sequential data 124 and the classification of facial expression 123 as the sign-language data to be registered; and input/output areas 812–821 for controlling the display method of the image data, which are the same as those of FIG. 7.

Figure 5:
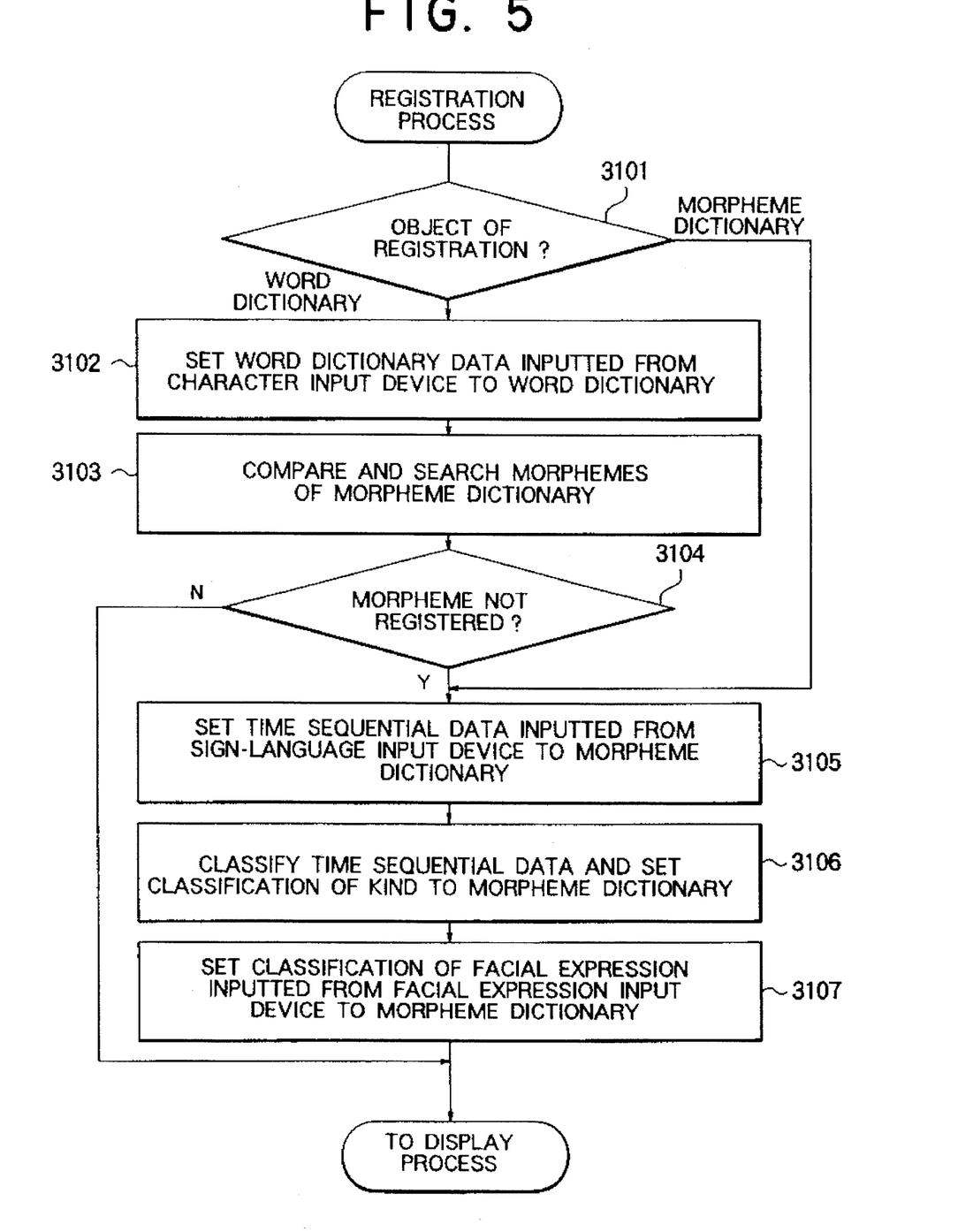
FIG. 5 shows a registration process.

FIG. 5 shows the operation of the registration control part 31 of the dictionary registration unit 3 in this embodiment. The operation is activated when the search is designated in the input/output area 807.

In step 3101, whether the registration is the registration of only the morpheme dictionary 12 in the sign-language dictionary 1 or the registration of both the word dictionary 11 and the morpheme dictionary 12 in the sign-language dictionary 1 is judged from the input/output area 805. If it is the registration of only the morpheme dictionary 12, the registration of the word dictionary 11 is skipped, and the flow proceeds to step 3105.

In step 3102, the data to be registered to the word dictionary 11 of the sign-language dictionary 1, that is, the input/output areas 801 to 804 and 810, are inputted from the character input device 4, the new entry words 11 are generated in the word dictionary 11, and the classification of the fields 112, the classification of languages 113, the morpheme strings 114 and the text 115 are stored.

In step 3103, whether or not all the morphemes designated by the input/output area 804 exist in the morpheme dictionary 12 of the sign-language dictionary 1 is examined by the comparator 32. If all of them exist, the registration process is completed and if not, the flow proceeds to step 3105 and the registration to the morpheme dictionary 12 is carried out.

In step 3105, the motion of the hands for the non-registered morphemes is inputted to the morpheme dictionary 12 of the sign-language dictionary 1 by the sign-language input device 6, and is stored as the sign-language data (time sequential data) 124.

In step 3106, the classification of kind 122 of sign-language data (time sequential data) 124 of the morpheme is determined by the classifier 33 of the dictionary registration unit 3 and is stored in the morpheme dictionary 12 of the sign-language dictionary 1. The operation of this classifier 33 is the same as that of the classifier 23 of the dictionary search means 2 described above.

In step 3107, the facial expression inputted from the camera 71 of the facial expression input device 7 is recognized by the facial expression recognition part 72, and the result is stored in the classification of facial expression 123 of the morpheme dictionary 12 of the sign-language dictionary 1. A method described in IEICE (The Institute of Electronics, Information and Communication Engineerings), Fall Conference D-408 (1990), pp. 6–410, for example, is known as the recognition method of the facial expression. Further, the method described in U.S. application Ser. No. 08/111,380 filed Aug. 23, 1993 by the inventors and entitled "SIGN RECOGNITION APPARATUS AND METHOD AND SIGN TRANSLATION SYSTEM USING SAME" can be also used.

When the registration process is completed, the display process shown in FIG. 6 is carried out and the sign-language data registered is displayed. This display process is the same as the search process described above. The sign-language learning system can be also configured as a system which performs only the search process by storing the previously registered sign-language dictionary within the system or externally.

As described above, the embodiment makes it possible to search, register and display the sign-language data.

Though the embodiment uses the sensor 61 for the sign-language input device 6, the data can be inputted from the image using a camera.

It is also possible to register in advance the types of facial expressions as a menu in the facial expression input device 7, and to input the classification of the facial expressions 123 by menu selection.

The sign-language dictionary 1 may include a basic dictionary used in common by learners and an individual dictionary specific to each learner.

In the search process shown in FIG. 4, the words for the classification of the fields designated by the input/output area 702 can be searched and displayed at random by performing searching without designating the input/output areas 703 and 704. The display in the input/output areas 703 and 704 can be retarded by a predetermined time by designating "?" to the input/output areas 703 and 704. When these search methods are used, it becomes possible to concentratedly learn only the words of the specific field and to test the contents of learning.

Learning can be made in comparison with the sign-languages in other languages and dialects by effecting searching while changing the classification of languages of the input/output area 701.

Further, as the output device, a device such as a printer capable of producing a hard copy and a device such as a VTR capable oft recording pictures and sound can be also connected.

The configuration and the operation of the sign-language learning system have been described above, while the configuration of the sign language translation system described in U.S. patent application Ser. No. 08/029,045 filed Mar. 9, 1993 and entitled "SIGN LANGUAGE TRANSLATION SYSTEM AND METHOD" and U.S. patent application Ser. No. 08/111,380 filed Aug. 24, 1993 and entitled "SIGN RECOGNITION APPARATUS AND METHOD AND SIGN TRANSLATION SYSTEM USING SAME" may be added to the sign-language learning system. The contents of these applications are incorporated herein by reference. In this case, not only bidirectional communication between deaf people and hearing people but also learning of the sign-language can be made by a single system to construct a practical system.

According to the present invention, it is possible to acquire quickly and accurately the data of sign-language desired by a learner and, moreover, in the form matching the requirement of individual learner. At the same time, since the individual learners can easily make additional registration, the effect of learning can be improved remarkably.

What is claimed is:

1. In an automated sign-language learning system of the type including means for inputting data, means for storing data, means for processing data, and means for outputting results of the processing, the improvement comprising:

first input means for inputting sign-language data;

memory means for storing sign-language data for each morpheme constituting a minimum unit of sign-language into a first dictionary, and for storing word data of a spoken language and a combined expression of morphemes of the sign-language which correspond to the word data of the spoken language into a second dictionary;

registration means for registering the sign-language data inputted by said first input means into said memory means;

second input means for inputting word data of the spoken language by characters or speech;

search means for comparing the word data of the spoken language inputted by said second input means with the word data of the spoken language preserved in said second dictionary and, if there are word data of the spoken language corresponding to word data inputted by said second input means, reading out pertinent data among the sign-language data for each morpheme stored in said first dictionary on the basis of the combined expression of morphemes of the sign-language in said second dictionary; and means for synthesizing and outputting a sign-language image from the sign-language data searched by said search means.

2. A sign-language learning system according to claim 1, wherein said second dictionary stores information used for learning of the sign-language in accordance with each field of the words of the spoken language set by a learner.

3. A sign-language learning system according to claim 1, wherein said first dictionary stores sign-language data in accordance with each field of morpheme classified by a learner.

4. A sign-language learning system according to claim 1, wherein said memory means includes a common memory for a plurality of users, and individual memories each unique to a different one of the plurality of users.

5. A sign-language learning system according to claim 1, wherein said search means searches pertinent sign-language data on condition that the sign-language data are coincident with the morphemes of the sign-language which completely represent the word data of the spoken language or partially represent the word data of the spoken language.

6. A sign-language learning system according to claim 1, wherein said image synthesizing and outputting means outputs motion of the sign-language in accordance with a point of view required by a sign-language learner.

7. A sign-language learning system according to claim 1, wherein said image synthesizing and outputting means changes the speed of motion of the sign-language in accordance with a requirement of a learner.

8. A sign-language learning system according to claim 1, wherein said image synthesizing and outputting means produces a laterally inverted object in a sign-language operation in accordance with a requirement of a learner.

9. A sign-language learning system according to claim 1, wherein said image synthesizing and outputting means outputs the sign-language in a language required by a learner.

10. A sign-language learning system according to claim 1, wherein said image synthesizing and outputting means delays the output thereof by a predetermined time in accordance with a requirement of a learner.

11. A sign-language learning system according to claim 1, wherein said image synthesizing and outputting means outputs etymology in accordance with a requirement of a learner.

12. A sign-language learning system according to claim 1, wherein said first input means for inputting the sign-language data is employed to enable a learner to make an examination.

13. In an automated sign-language learning method of the type performed using a system including means for inputting data, means for storing data, means for processing data, and means for outputting results of the processing, the improvement comprising the steps of:

inputting first sign-language data at a time of registration to a memory;

storing sign-language data for each morpheme constituting a minimum unit of a sign-language into a first dictionary and storing word data of a spoken language and a combined expression of morphemes of the sign-language which correspond to the word data of the spoken language into a second dictionary;

registering the first inputted sign-language data in the memory;

inputting word data of the spoken language by characters or speech;

comparing the inputted word data of the spoken language with the word data of the spoken language preserved in said second dictionary and, if there are word data of the spoken language corresponding to the inputted word data, reading out pertinent data among the sign-language data for each morpheme stored in said first dictionary on the basis of the combined expression of morphemes of the sign-language in said second dictionary; and synthesizing and outputting a sign-language image from the read-out sign-language data.

* * * * *